United States Patent
Chen

(10) Patent No.: US 8,552,806 B2
(45) Date of Patent: Oct. 8, 2013

(54) APPARATUS FOR SUPPLYING CLOCK AND METHOD THEREOF

(75) Inventor: Yueh-Chang Chen, Hsinchu County (TW)

(73) Assignee: Altek Corporation, Hsinchu (TW)

( * ) Notice: Subject to any disclaimer, the term of this patent is extended or adjusted under 35 U.S.C. 154(b) by 50 days.

(21) Appl. No.: 13/304,690

(22) Filed: Nov. 28, 2011

(65) Prior Publication Data

US 2013/0076426 A1    Mar. 28, 2013

(30) Foreign Application Priority Data

Sep. 28, 2011 (TW) .............................. 100135033 A

(51) Int. Cl.
*H03B 5/32* (2006.01)
(52) U.S. Cl.
USPC ................. 331/158; 331/116 R; 331/116 FE; 331/175
(58) Field of Classification Search
USPC .......................... 331/158, 116 FE, 116 R, 175
See application file for complete search history.

(56) References Cited

U.S. PATENT DOCUMENTS 6,057,742 A * 5/2000 Prado ............................ 331/158

* cited by examiner

*Primary Examiner* — Arnold Kinkead
(74) *Attorney, Agent, or Firm* — Jianq Chyun IP Office

(57) ABSTRACT

An apparatus for providing clock and a method thereof are provided. The provided apparatus includes a frequency generation unit and a control unit. The frequency generation unit decides amplitude of a clock signal to be a first amplitude or a second amplitude in response to a mode signal. The frequency generation unit converts an external oscillation signal into the clock signal. The control unit receives the clock signal, and outputs the mode signal in response to a system status signal. The control unit outputs the clock signal to external when determining that the clock signal has a stable oscillation. When the system status signal is a power on signal, the first amplitude is used as the amplitude of the clock signal, and when the system status signal is a power off signal, the second amplitude smaller than the first amplitude is used as the amplitude of the clock signal.

14 Claims, 6 Drawing Sheets

APPARATUS FOR SUPPLYING CLOCK AND METHOD THEREOF

CROSS-REFERENCE TO RELATED APPLICATION

This application claims the priority benefit of Taiwan application serial no. 100135033, filed on Sep. 28, 2011. The entirety of the above-mentioned patent application is hereby incorporated by reference herein and made a part of this specification.

BACKGROUND OF THE INVENTION

1. Field of the Invention

The invention relates to an electronic clock technique. Particularly, the invention relates to an apparatus and a method for supplying clock adapted to an electronic clock system.

2. Description of Related Art

FIG. 1 is a schematic diagram of a conventional electronic clock system 100. Referring to FIG. 1, a general electronic device is configured with the electronic clock system 100, and the electronic clock system 100 provides a clock signal CLK required by the electronic device to ensure a normal operation of the electronic device. The electronic clock system 100 includes a frequency generation module 10, a phase locked loop (PLL) 20, a counter 30, a crystal oscillator 40 and a battery BAT. The electronic clock system 100 generates the clock system CLK of 32,768 Hz through the crystal oscillator 40 and the frequency generation module 10. The PLL 20 multiplies a frequency of the clock signal CLK and provides the same to a post circuit for utilization. The counter 30 uses the clock signal CLK to generate a date code.

A dot line LL' in FIG. 1 divides the electronic clock system 100 into two regions according to different power usage statuses. The region located to the left of the dot line LL' is always on, and even if the electronic device is power off, in order to display a correct date when the electronic clock system 100 is turned on next time, the region located to the left of the dot line LL' is kept operating, so that the counter 30 continues to operate. Moreover, a status of the region located to the right of the dot line LL' is determined according to the power usage status of the system, and such region is turned on when the system is power on, and is turned off when the system is power off. Therefore, when the system is power off, the frequency generation module 10 is still required to continually output the clock signal CLK to the counter 30, so that the power of the battery BAT is continuously consumed when the system is power off, which cannot be saved.

Generally, a dynamic power consumption $P=(\frac{1}{2}) \times (C \times V^2 \times f)$, where C, V and f respectively represent a capacitance, a voltage and a frequency, $V^2$ represents a square of the voltage. In theory, if amplitude of the voltage is decreased, the value P is decreased, and the power is saved. However, if the amplitude of the voltage is decreased, an obvious disadvantage is that a noise increases, and the noise or jitter may cause an inaccurate duty cycle of the clock signal CLK. Therefore, under the structure of the conventional electronic clock system 100, in order to save power, the frequency-multiplication clock output by the PLL 20 can be abnormal.

SUMMARY OF THE INVENTION

Accordingly, the invention is directed to an apparatus and a method for supplying clock, by which the problem mentioned in the related art is resolved.

The invention provides a clock supply apparatus, which includes a frequency generation unit and a control unit. The frequency generation unit decides amplitude of a clock signal to be a first amplitude or a second amplitude in response to a mode signal, and converts an external oscillation signal into the clock signal, where the first amplitude is greater than the second amplitude. The control unit is coupled to the frequency generation unit and receives the clock signal, and outputs the mode signal in response to a system status signal. When the control unit determines that the clock signal has a stable oscillation, the control unit supplies the clock signal to external. When the system status signal is a power on signal, the first amplitude is used as the amplitude of the clock signal, and when the system status signal is a power off signal, the second amplitude is used as the amplitude of the clock signal.

In an embodiment of the invention, the frequency generation unit includes a first driving unit, a second driving unit, a first inverter and a second inverter. The first driving unit is used for converting the external oscillation signal into a first wave signal, and determining whether or not to output the first wave signal in response to the mode signal. The second driving unit is used for converting the external oscillation signal into a second wave signal, and determining whether or not to output the second wave signal in response to the mode signal. The first inverter is coupled to the second driving unit, and is used for inverting the mode signal. The second inverter is coupled to an output of the first driving unit and an output of the second driving unit for converting the first wave signal into the clock signal with the first amplitude or converting the second wave signal into the clock signal with the second amplitude.

In an embodiment of the invention, the first driving unit includes a first buffer and a first switch. The first buffer is used for converting the external oscillation signal into the first wave signal. The first switch is coupled in series to an output of the first buffer, and determines whether or not to turn on in response to the mode signal. The second driving unit includes a second buffer and a second switch. The second buffer is used for converting the external oscillation signal into the second wave signal. The second switch is coupled in series to an output of the second buffer, and determines whether or not to turn on in response to an inverting signal of the mode signal.

In an embodiment of the invention, the control unit includes an edge detection circuit. The edge detection circuit receives the system status signal and the clock signal, and outputs a pulse signal and the mode signal in response to the system status signal and the clock signal, where the pulse signal is used for disabling outputting the clock signal to external. The edge detection circuit detects a rising edge or a falling edge of the system status signal, and outputs the pulse signal in collaboration with a negative edge of the clock signal.

In an embodiment of the invention, the edge detection circuit includes a first flip-flop, a second flip-flop and an exclusive-OR (XOR) operation unit. The first flip-flop has a clock terminal for receiving the clock signal, and the first flip-flop outputs according to the system status signal and the negative edge of the clock signal. The second flip-flop has a clock terminal for receiving the clock signal, and the second flip-flop outputs according to an output of the first flip-flop and the negative edge of the clock signal to produce and output the mode signal. The XOR operation unit receives the output of the first flip-flop and an output of the second flip-flop, and generates and outputs the pulse signal.

In an embodiment of the invention, the control unit further includes a logic operation unit. The logic operation unit is coupled to the edge detection circuit for counting a cycle number of the clock signal, where when the pulse signal is received during the counting process, the logic operation unit recounts the cycle number of the clock signal and does not output the clock signal to the external, and when the counted cycle number reaches a predetermined value, the logic operation unit outputs the clock signal to the external.

The invention provides a method for supplying clock, which includes following step. (a) determining a magnitude of amplitude of a clock signal according to a system status signal; (b) converting an external oscillation signal into the clock signal; and (c) supplying the clock signal to external when it is determined that the clock signal has a stable oscillation.

In an embodiment of the invention, the step (a) further includes: using a first amplitude as the amplitude of the clock signal when the system status signal is a power on signal; and using the second amplitude as the amplitude of the clock signal when the system status signal is a power off signal, where the first amplitude is greater than the second amplitude.

According to the above descriptions, in the invention, the system status signal is used to determine the magnitude of the amplitude of the clock signal for dynamic switching. When the electronic clock system is power on, the relatively large amplitude is used to achieve better anti-noise capability. On the other hand, when the electronic clock system is power off, the relatively small amplitude is used to save power. Therefore, the invention can effectively resolve the problem encountered by the conventional electronic clock system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
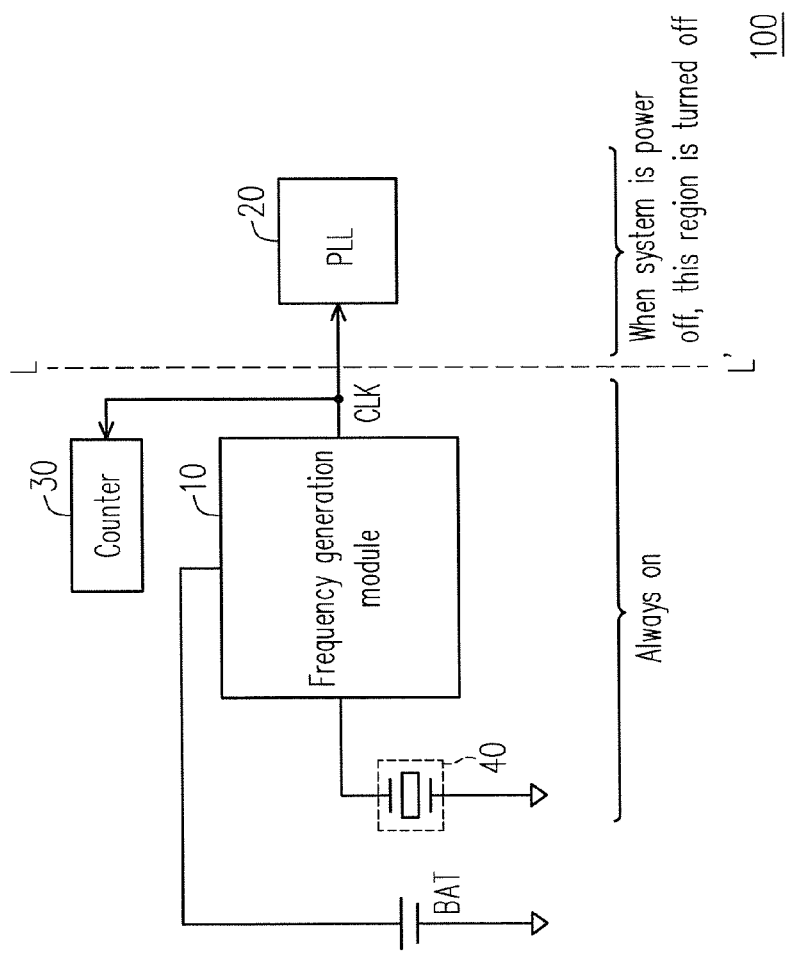
FIG. 1 is a schematic diagram of a conventional electronic clock system.

Reference will now be made in detail to the present preferred embodiments of the invention, examples of which are illustrated in the accompanying drawings. Wherever possible, the same reference numbers are used in the drawings and the description to refer to the same or like parts.

Figure 2:
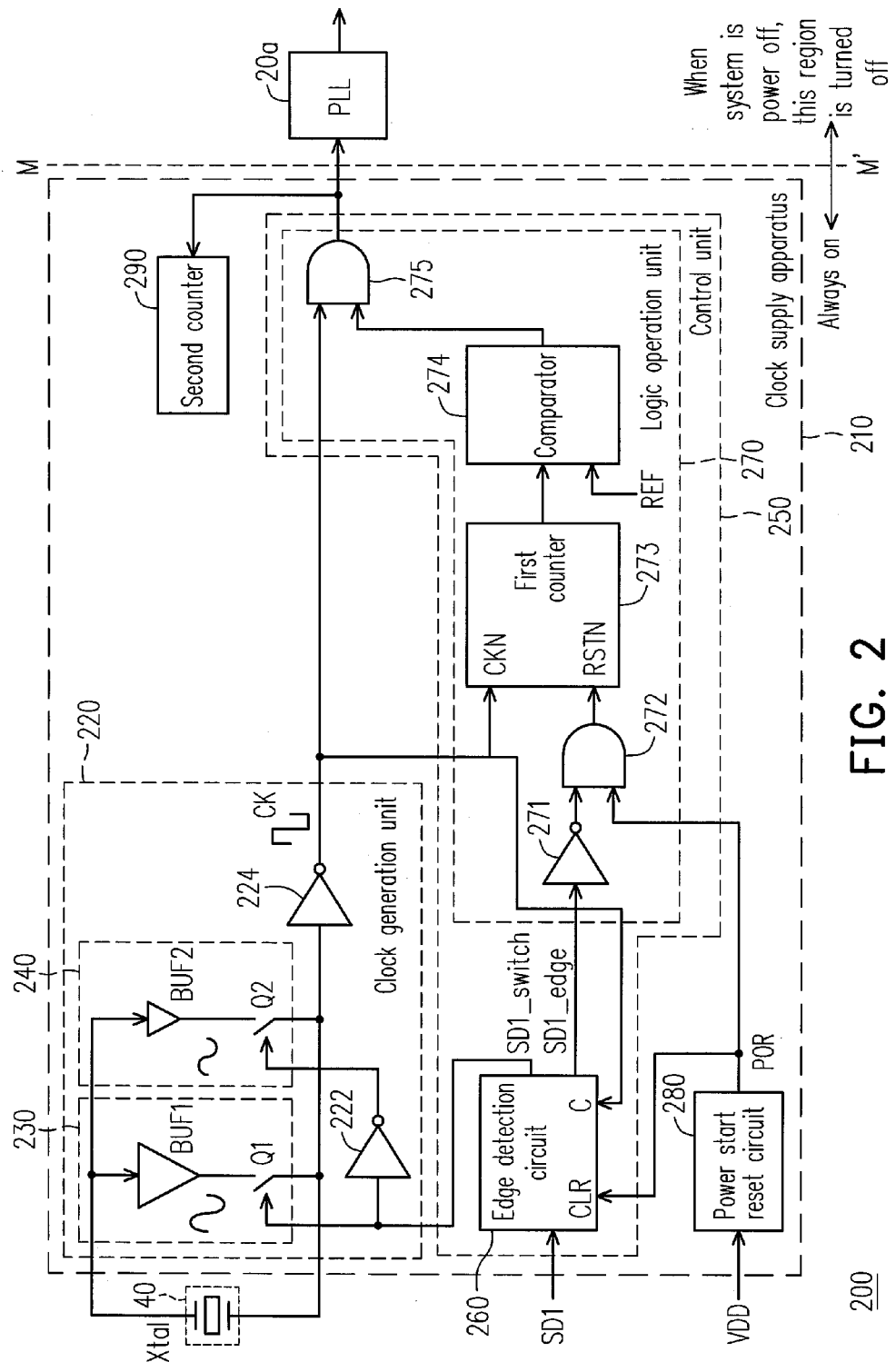
FIG. 2 is a schematic diagram of an electronic clock system according to an embodiment of the invention.

FIG. 2 is a schematic diagram of an electronic clock system 200 according to an embodiment of the invention. Referring to FIG. 2, the electronic clock system 200 includes a clock supply apparatus 210 and a phase locked loop (PLL) 20a. The electronic clock system 200 can be applied to various electronic devices, such as a digital still camera (DCS), or a mobile phone, etc., though the invention is not limited thereto, the clock supply apparatus 210 includes a frequency generation unit 220 and a control unit 250. The frequency generation unit 220 includes a first driving unit 230 and a second driving unit 240, and controls the first driving unit 230 and the second driving unit 240 in response to a mode signal SD1_switch to decide amplitude of a clock signal CK to be a first amplitude or a second amplitude, where a cycle of the clock signal CK is not changed. The frequency generation unit 220 converts an oscillation signal Xta1 (analog) received from a crystal oscillator 40 into the clock signal CK (digital). The first amplitude generated by the first driving unit 230 is greater than the second amplitude generated by the second driving unit 240. The PLL 20a is known by those skilled in the art, so that a detailed description thereof is not repeated.

Figure 5:
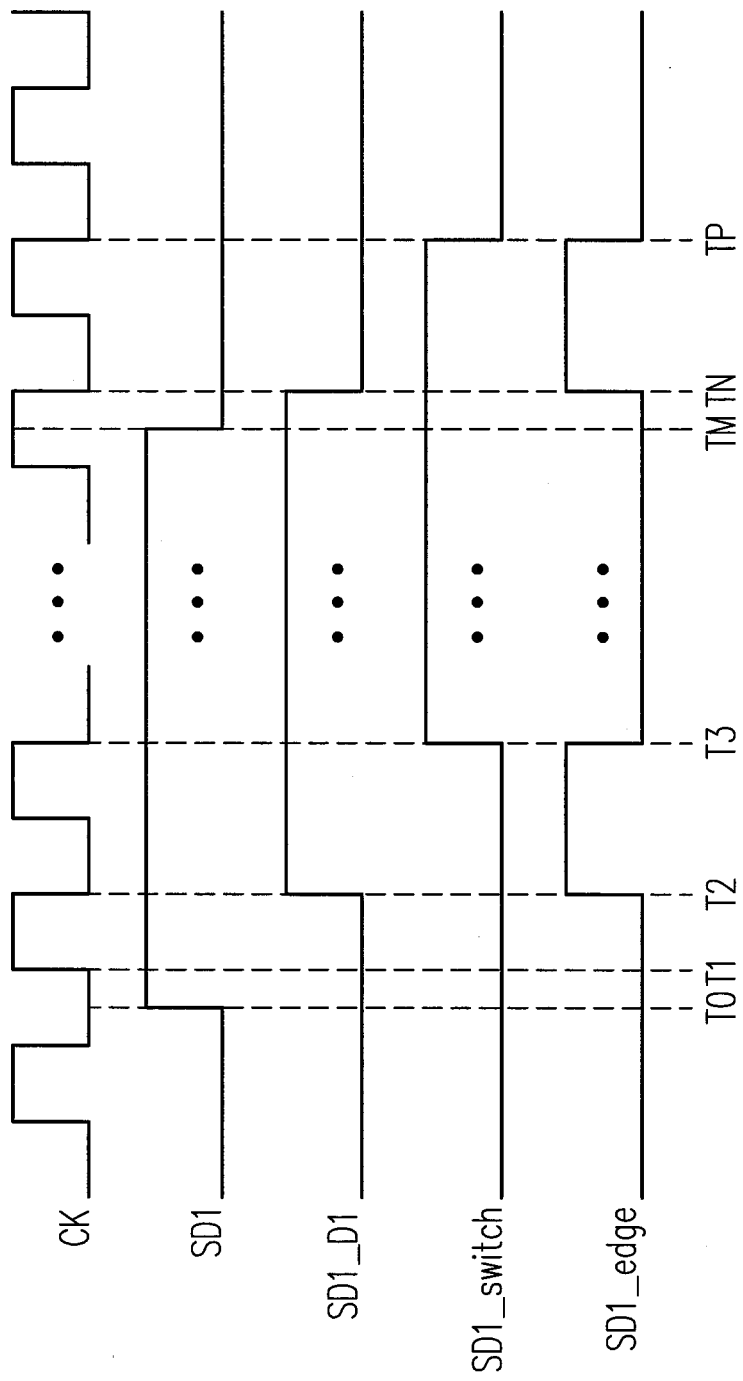
FIG. 5 is a timing diagram of the edge detection circuit 260 of FIG. 3.

The control unit 250 is coupled to the frequency generation unit 220 and receives the clock signal CK, and outputs the mode signal SD1_switch in response to a system status signal SD1 (referring to FIG. 5). When the control unit 250 determines that the clock signal CK has a stable oscillation, the control unit 250 outputs the clock signal CK to the PLL 20a. A user can press (or push) a start button to generate the system status signal SD1. The method of determining the stable oscillation is described later. The PLL 20a can double a frequency of the clock signal CK (for example, 12 MHz), and supply the same to the post end circuit for utilization. A method of determining the amplitude of the clock signal CK is as follows. When the system status signal SD1 is a power on signal (referring to FIG. 5, the system status signal SD1 is a power on signal during time points T0-TM), and the first driving unit 230 is turned on to use the first amplitude as the amplitude of the clock signal CK, and when the system status signal SD1 is a power off signal (referring to FIG. 5, the system status signal SD1 is a power off signal after the time point TM), and the second driving unit 240 is turned on to use the second amplitude as the amplitude of the clock signal CK.

In the present embodiment, besides the first driving unit 230 and the second driving unit 240, the frequency generation unit 220 further includes a first inverter 222 and a second inverter 224. The first driving unit 230 includes a first buffer BUF1 and a first switch Q1. The first buffer BUF1 is used for converting the oscillation signal Xta1 into a first wave signal (an analog signal). The first switch Q1 is coupled in series to an output of the first buffer BUF1, and determines whether or not to turn on in response to the mode signal SD1_switch. The second driving unit 240 includes a second buffer BUF2 and a second switch Q2. The second buffer BUF2 is used for converting the oscillation signal Xta1 into a second wave signal (an analog signal). The second switch Q2 is coupled in series to an output of the second buffer BUF2, and determines whether or not to turn on in response to an inverting signal of the mode signal SD1_switch. In this way, the first switch Q1 and the second switch Q2 can implement a dynamic switching operation.

It should be noticed that a thrust of the first buffer BUF1 is greater than a thrust of the second buffer BUF2, so that amplitude of the first wave signal is greater than amplitude of the second wave signal. The first inverter 222 is coupled between the first driving unit 230 and the second driving unit 240 for inverting the mode signal SD1_switch. The second inverter 224 is coupled to the outputs of the first driving unit 230 and the second driving unit 240. Therefore, the frequency generation unit 220 can convert the first wave signal (analog signal) into the clock signal CK (digital signal) with the first amplitude, or convert the second wave signal (analog signal) into the clock signal CK (digital signal) with the second amplitude.

Figure 3:
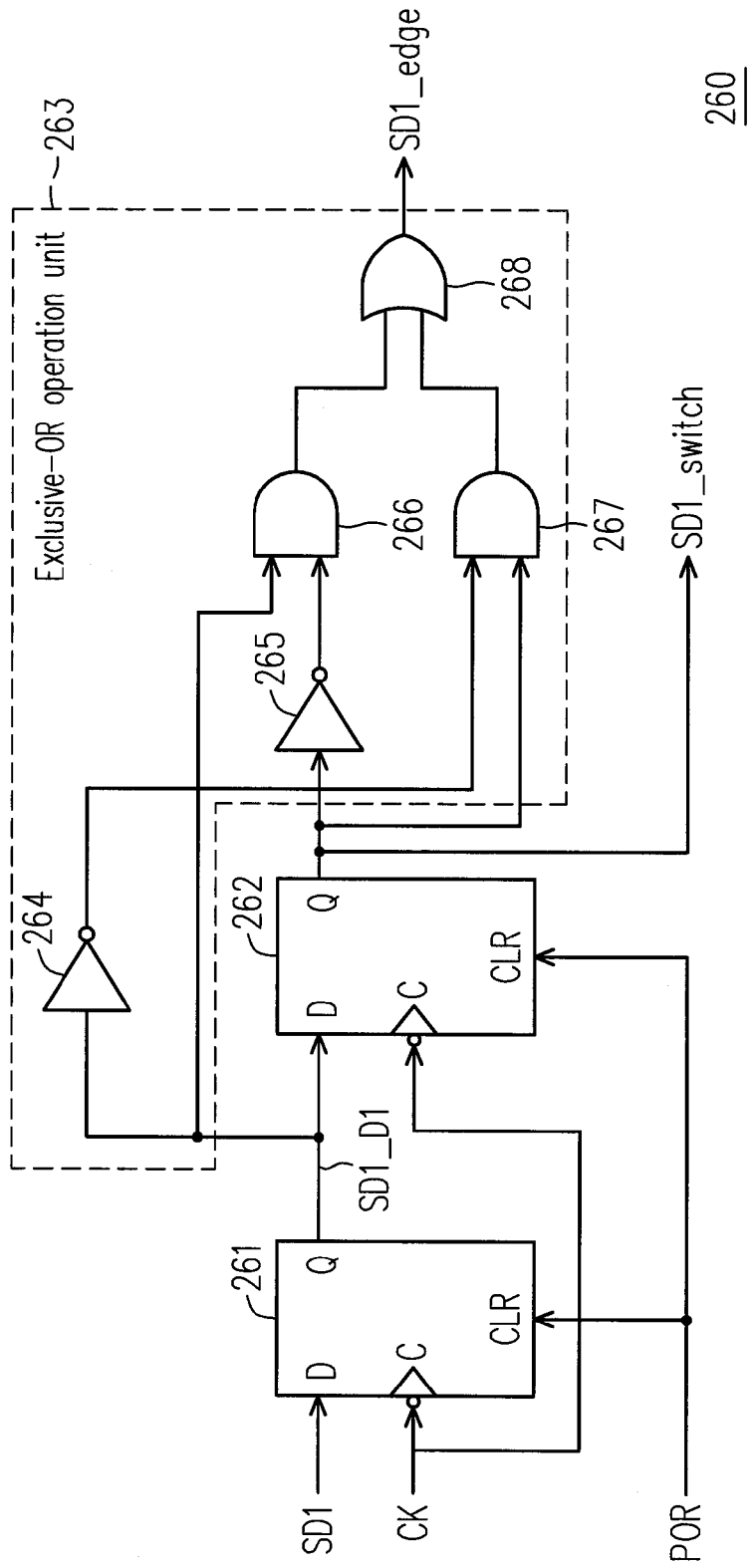
FIG. 3 is a detailed circuit diagram of an edge detection circuit 260 of FIG. 2.
Figure 4:
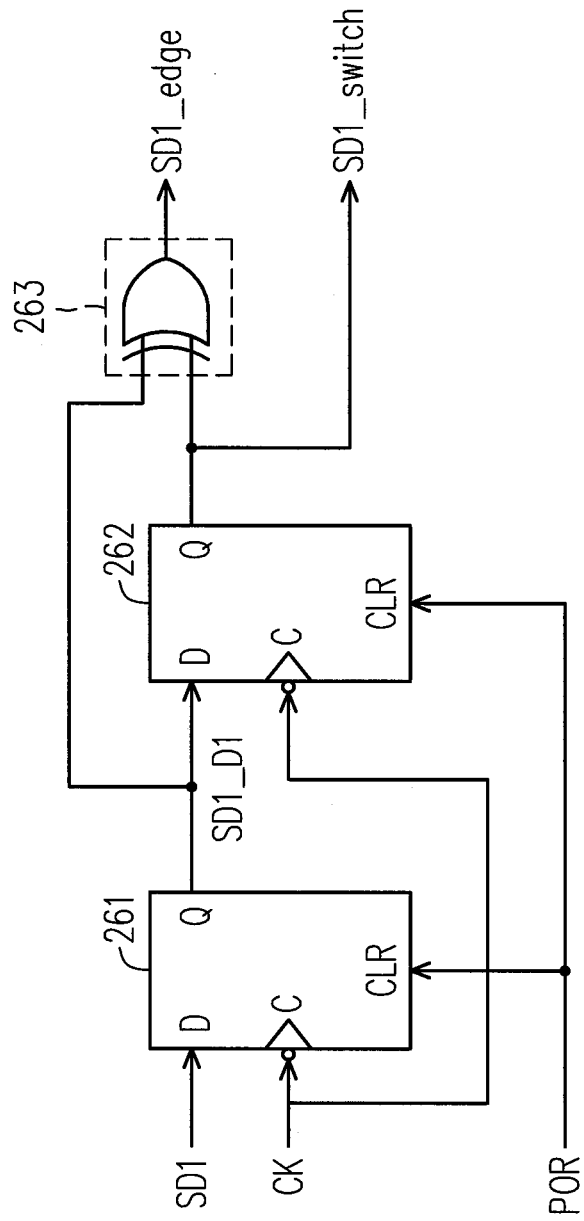
FIG. 4 is another circuit diagram of the edge detection circuit 260 of FIG. 2.

Moreover, the control unit 250 includes an edge detection circuit 260. The edge detection circuit 260 receives the system status signal SD1 and the clock signal CK, and outputs a pulse signal SD1_edge and the mode signal SD1_switch in response to the system status signal SD1 and a negative edge of the clock signal CK. FIG. 3 is a detailed circuit diagram of the edge detection circuit 260 of FIG. 2. FIG. 4 is another circuit diagram of the edge detection circuit 260 of FIG. 2. FIG. 5 is a timing diagram of the edge detection circuit 260 of FIG. 3. Referring to FIG. 2 to FIG. 5, the edge detection circuit 260 includes a first flip-flop 261, a second flip-flop 262 and an exclusive-OR (XOR) operation unit 263. Each one of the first flip-flop 261 and the second flip-flop 262 has a clock terminal C for receiving the clock signal CK and an output terminal Q. The first flip-flop 261 outputs according to the system status signal SD1 and the negative edge of the clock signal CK. The second flip-flop 262 receives an output (SD1_D1) of the first flip-flop 261, and outputs according to the output of the first flip-flop 261 and the negative edge of the clock signal CK, and delays the output of the first flip-flop by a cycle of the clock signal CK to produce and output the mode signal SD1_switch. The first flip-flop 261 and the second flip-flop 262 can be implemented by D-type flip-flops, though the invention is not limited thereto. The XOR operation unit 263 receives the output of the first flip-flop 261 and the output of the second flip-flop 262, and generates and outputs the pulse signal SD1_edge through a logic operation of exclusive-OR, wherein the pulse signal SD1_edge disables outputting the clock signal CK to the PLL 20a.

In the present embodiment, the XOR operation unit 263 performs the logic operation of exclusive-OR. In FIG. 3, the XOR operation unit 263 includes a third inverter 264, a fourth inverter 265, first AND gate 266, a second AND gate 267 and an OR gate 268. The third inverter 264 receives the output of the first flip-flop 261. The fourth inverter 265 receives the output of the second flip-flop 262. The first AND gate 266 receives the output of the first flip-flop 261 and an output of the fourth inverter 265. The second AND gate 267 receives the output of the second flip-flop 262 and an output of the third inverter 264. The OR gate 268 receives an output of the first AND gate 266 and an output of the second AND gate 267. In this way, the OR gate 268 can generate and output the pulse signal SD1_edge, where a logic expression of the pulse signal SD1_edge is as follows: SD1_edge= $\overline{SD1\_D1}\cdot SD1\_switch+SD1\_D1\cdot \overline{SD1\_switch}$. In FIG. 4, the XOR operation unit 263 can be implemented through an XOR gate. According to the above descriptions, those skilled in the art can deduce other implementations of the XOR operation unit, and details thereof are not repeated.

Referring to FIG. 3 (or FIG. 4) and FIG. 5, the system status signal SD1 is the power on signal during the time points T0-TM, and the system status signal SD1 is a power off signal after the time point TM. The first flip-flop 261 of the edge detection circuit 260 detects a rising edge of the system status signal SD1 at a time point T2 (sampling the negative edge of the clock signal CK), or detects a falling edge at the time point TN (sampling the negative edge of the clock signal CK). Then, the XOR operation unit 263 uses the output (SD1_D1) of the first flip-flop 261 and the output (the mode signal SD1_switch) of the second flip-flop 262 to respectively produce two pulse signals SD1_edge during the time points T2-T3 and TN-TP in collaboration with a cycle variation (negative edge sampling) of the clock signal CK, which can be used to reset a counter for recounting (a counting technique is described in detail later). The pulse signals SD1_edge are used to disable outputting the clock signal CK to the PLL 20a during the time points T2-T3 and TN-TP. The click signal CK has the first amplitude during the time points T3-TN, and has the second amplitude after the time point TP.

Referring to FIG. 2, the control unit 250 further includes a logic operation unit 270. The logic operation unit 270 is used to determine whether the clock signal CK has a stable oscillation, and only outputs the clock signal CK with the stable oscillation. The logic operation unit 270 is coupled to the edge detection circuit 260 for counting a cycle number of the clock signal CK. When the pulse signal SD1_edge is received during the counting process, the logic operation unit 270 recounts the cycle number of the clock signal CK and does not output the clock signal CK to the PLL 20a, and when the counted cycle number reaches a predetermined value, it represents that the clock signal CK has the stable oscillation, and now the clock signal CK is applicable, so that the clock signal CK is output to the PLL 20a. The predetermined value can be a time required to achieve the stable oscillation from a start-up oscillation of the clock signal CK, so that the time required to achieve the stable oscillation can be converted into an equivalent cycle number.

In the present embodiment, the logic operation unit 270 includes a fifth inverter 271, a third AND gate 272, a first counter 273, a comparator 274 and a fourth AND gate 275. The fifth inverter 271 is used for inverting the pulse signal SD1_edge. The third AND gate 272 is used for receiving a reset signal POR and an output of the fifth inverter 271. The pulse signal SD1_edge resets the first counter 273 for recounting. The first counter 273 has an input terminal CKN for receiving the clock signal CK, and the first counter 273 counts the cycle number of the clock signal CK. Moreover, the first counter 273 has a reset terminal RSTN for receiving an output of the third AND gate 272 to determine whether or not to recount. The comparator 274 compares an output of the first counter 273 and a predetermined value REF, so as to determine whether the clock signal CK has the stable oscillation. If the comparator 273 outputs a logic H, it represents that the clock signal CK has the stable oscillation. The fourth AND gate 275 is used for receiving the clock signal CK and the output of the comparator 275. Therefore, when the clock signal CK is determined to have the stable oscillation, the fourth AND gate 275 supplies the clock signal CK to the PLL 20a. Moreover, implementation of the logic operation unit 270 is not limited to the aforementioned implementation pattern.

According to the above descriptions, the system status signal is used to determine a magnitude of the amplitude of the clock signal, and when the electronic clock system 200 is power on, the relatively large amplitude is used to narrow a jitter range of noise, so as to exclude an error operation caused by noise or jitter, and achieve better anti-noise capability. On the other hand, when the electronic clock system 200 is power off, the relatively small amplitude is used, and since a region located to the right of a dot line MM' is power off, the noise generated by the region located to the right of the dot line MM' can be omitted, so that the value V in the equation $P=(\frac{1}{2})\times(C\times V^2\times f)$ is reduced to save power.

On the other hand, the clock supply apparatus 210 of the embodiment further includes a power start reset circuit 280 and a second counter 290. The power start reset circuit 280 is coupled to a reset terminal CLR of the edge detection circuit 260 and the logic operation unit 270, and detects a working voltage VDD to output the reset signal POR. When the working voltage VDD is just powered, the voltage value is gradually increased, and it cannot be supplied to the electronic clock system 200 for utilization before reaching a stable voltage. The power start reset circuit 280 is used to ensure a stable state of the working voltage VDD. If the working voltage VDD is stable, the control unit 250 counts. When the power start reset circuit 280 determines that the working voltage VDD is unstable, the power start reset circuit 280 outputs the reset signal POR, and the reset signal POR has a first logic level (for example, logic L). When the working voltage VDD is determined stable, the reset signal POR has a second logic level (for example, logic H). The control unit 250 stops operation in response to the first logic level of the reset signal POR. The second counter 290 is coupled to the output of the control unit 250, and counts the clock signal CK to produce a correct date code.

The dot line MM' in the figure can divide the electronic clock system 200 into two regions according to different power usage statuses. The region located to the left of the dot line MM' is always on, and even if the electronic device is power off, the region located to the left of the dot line MM' is kept operating to output the clock signal CK with the second amplitude (relatively small amplitude) to the second counter 290, so that the electronic clock system 200 can display a correct date when it is power on for the next time. Since the clock signal CK has the smaller second amplitude, power is saved compared to the first amplitude (relatively large amplitude) used when the system is power on. Moreover, a status of the region located to the right of the dot line MM' is determined according to the power usage status of the system, and such region is turned on when the system is power on, and is turned off when the system is power off. When the system is power on, the clock signal CK has the relatively large first amplitude, so that a better anti-noise capability is achieved to exclude the error operation caused by the noise or jitter.

Figure 6:
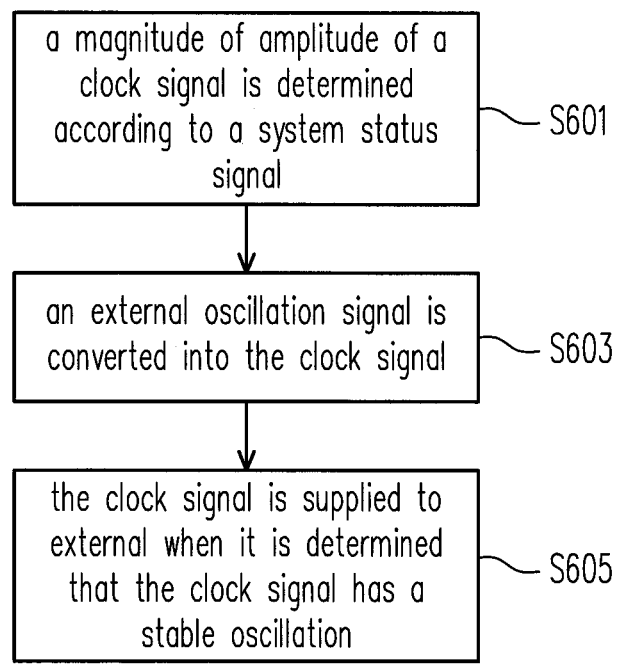
FIG. 6 is a flowchart illustrating a method for supplying clock according to an embodiment of the invention.

A method for supplying clock is deduced according to instructions of the aforementioned embodiment. In detail, FIG. 6 is a flowchart illustrating a method for supplying clock according to an embodiment of the invention. Referring to FIG. 6, the method for supplying clock of the embodiment includes following steps.

First, in step S601, a magnitude of amplitude of a clock signal is determined according to a system status signal (power on or power off).

Then, in step S603, an external oscillation signal is converted into the clock signal.

Finally, in step S605, the clock signal is supplied to external when it is determined that the clock signal has a stable oscillation.

Moreover, the step S601 further includes following steps: a first amplitude is used as the amplitude of the clock signal when the system status signal is a power on signal, and the second amplitude is used as the amplitude of the clock signal when the system status signal is a power off signal, where the first amplitude is greater than the second amplitude.

In summary, in the invention, the system status signal is used to determine the magnitude of the amplitude of the clock signal for dynamic switching. When the electronic clock system is power on, the relatively large amplitude is used to achieve better anti-noise capability. On the other hand, when the electronic clock system is power off, the relatively small amplitude is used to save power.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A clock supply apparatus, comprising:
   a frequency generation unit, deciding amplitude of a clock signal to be a first amplitude or a second amplitude in response to a mode signal, and converting an external oscillation signal into the clock signal, wherein the first amplitude is greater than the second amplitude;
   a control unit, coupled to the frequency generation unit and receiving the clock signal, outputting the mode signal in response to a system status signal, and supplying the clock signal to external when determining that the clock signal has a stable oscillation; and
   a counter, coupled to an output of the control unit, and counting the clock signal to generate a date code,
   wherein when the system status signal is a power on signal, the first amplitude is used as the amplitude of the clock signal, and when the system status signal is a power off signal, the second amplitude is used as the amplitude of the clock signal.

2. The clock supply apparatus as claimed in claim 1, wherein the frequency generation unit comprises:
   a first driving unit, converting the external oscillation signal into a first wave signal, and determining whether or not to output the first wave signal in response to the mode signal;
   a second driving unit, converting the external oscillation signal into a second wave signal, and determining whether or not to output the second wave signal in response to the mode signal;
   a first inverter, coupled to the second driving unit, and inverting the mode signal; and
   a second inverter, coupled to an output of the first driving unit and an output of the second driving unit, and converting the first wave signal into the clock signal with the first amplitude or converting the second wave signal into the clock signal with the second amplitude.

3. The clock supply apparatus as claimed in claim 2, wherein the first driving unit comprises:
   a first buffer, converting the external oscillation signal into the first wave signal; and
   a first switch, coupled in series to an output of the first buffer, and determining whether or not to turn on in response to the mode signal.

4. The clock supply apparatus as claimed in claim 2, wherein the second driving unit comprises:
   a second buffer, converting the external oscillation signal into the second wave signal; and
   a second switch, coupled in series to an output of the second buffer, and determining whether or not to turn on in response to an inverting signal of the mode signal.

5. The clock supply apparatus as claimed in claim 2, wherein the control unit comprises:
   an edge detection circuit, receiving the system status signal and the clock signal, and outputting a pulse signal and the mode signal in response to the system status signal and the clock signal, wherein the pulse signal is used for disabling outputting the clock signal to external.

6. The clock supply apparatus as claimed in claim 5, wherein the edge detection circuit detects a rising edge or a falling edge of the system status signal, and outputs the pulse signal in collaboration with a negative edge of the clock signal.

7. The clock supply apparatus as claimed in claim 6, wherein the edge detection circuit comprises:
   a first flip-flop, having a clock terminal for receiving the clock signal, and outputting according to the system status signal and the negative edge of the clock signal;

a second flip-flop, having a clock terminal for receiving the clock signal, and outputting according to an output of the first flip-flop and the negative edge of the clock signal to produce and output the mode signal; and an exclusive-OR operation unit, receiving the output of the first flip-flop and an output of the second flip-flop, and generating and outputting the pulse signal.

8. The clock supply apparatus as claimed in claim 7, wherein the exclusive-OR operation unit comprises:

a third inverter, receiving the output of the first flip-flop;

a fourth inverter, receiving the output of the second flip-flop;

a first AND gate, receiving the output of the first flip-flop and an output of the fourth inverter;

a second AND gate, receiving the output of the second flip-flop and an output of the third inverter; and an OR gate, receiving an output of the first AND gate and an output of the second AND gate for generating and outputting the pulse signal.

9. The clock supply apparatus as claimed in claim 7, wherein the exclusive-OR operation unit is an exclusive-OR gate.

10. The clock supply apparatus as claimed in claim 8, wherein the control unit further comprises:

a logic operation unit, coupled to the edge detection circuit, and counting a cycle number of the clock signal, wherein when the pulse signal is received during the counting process, the logic operation unit recounts the cycle number of the clock signal and does not output the clock signal to external, and when the counted cycle number reaches a predetermined value, the logic operation unit outputs the clock signal to external.

11. The clock supply apparatus as claimed in claim 10, wherein the logic operation unit comprises:

a fifth inverter, inverting the pulse signal;

a third AND gate, receiving a reset signal and an output of the fifth inverter;

a first counter, receiving and counting the clock signal, and determining whether or not to recount in response to an output of the third AND gate;

a comparator, comparing an output of the first counter and the predetermined value to determine whether the clock signal has the stable oscillation; and a fourth AND gate, receiving the clock signal and an output of the comparator.

12. The clock supply apparatus as claimed in claim 10, further comprising:

a power start reset circuit, coupled to the edge detection circuit and the logic operation unit, and detecting a working voltage to output a reset signal, wherein when the power start reset circuit determines that the working voltage is unstable, the reset signal has a first logic level, and when the power start reset circuit determines that the working voltage is stable, the reset signal has a second logic level, wherein the control unit stops operation in response to the reset signal of the first logic level.

13. The clock supply apparatus as claimed in claim 1, wherein the external oscillation signal is generated by a crystal oscillator.

14. A method for supplying clock, comprising:

(a) determining a magnitude of amplitude of a clock signal according to a system status signal;

(b) converting an external oscillation signal into the clock signal;

(c) supplying the clock signal to external when it is determined that the clock signal has a stable oscillation; and (d) counting the clock signal to generate a date code, wherein the step (a) further comprises:

using a first amplitude as the amplitude of the clock signal when the system status signal is a power on signal; and using the second amplitude as the amplitude of the clock signal when the system status signal is a power off signal, wherein the first amplitude is greater than the second amplitude.

\* \* \* \* \*